(12) United States Patent
Kim et al.

(10) Patent No.: US 11,503,890 B2
(45) Date of Patent: Nov. 22, 2022

(54) COVER AND ELECTRONIC DEVICE HAVING SAME

(71) Applicant: Samsung Electronics Co., Ltd, Suwon-si (KR)

(72) Inventors: Byoung Jin Kim, Seoul (KR); Jun Yong Song, Seongnam-si (KR); Joon Ki Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 16/472,826

(22) PCT Filed: Dec. 27, 2017

(86) PCT No.: PCT/KR2017/015553
§ 371 (c)(1),
(2) Date: Jun. 21, 2019

(87) PCT Pub. No.: WO2018/128318
PCT Pub. Date: Jul. 12, 2018

(65) Prior Publication Data
US 2022/0007804 A1    Jan. 13, 2022

(30) Foreign Application Priority Data
Jan. 4, 2017 (KR) .......................... 10-2017-0001236

(51) Int. Cl.
*A45C 11/00* (2006.01)
*A45C 13/00* (2006.01)
(Continued)

(52) U.S. Cl.
CPC ............ *A45C 11/00* (2013.01); *A45C 13/005* (2013.01); *G02B 6/0045* (2013.01); *G02B 6/10* (2013.01);
(Continued)

(58) Field of Classification Search
CPC ............. A45C 11/00; A45C 2011/001; A45C 2011/002; A45C 2011/003;
(Continued)

(56) References Cited

U.S. PATENT DOCUMENTS 5,897,201 A * 4/1999 Simon .................. G02B 6/0068
362/147
7,424,197 B2 * 9/2008 Winston ............... G02B 6/0056
385/901
(Continued)

FOREIGN PATENT DOCUMENTS

CN          2409721 Y  * 12/2000
CN       202635919 U  *  1/2013
(Continued)

OTHER PUBLICATIONS

Supplementary European Search Report dated Nov. 15, 2019 in connection with European Patent Application No. 17 89 0208, 7 pages.
(Continued)

*Primary Examiner* — Justin M Larson

(57) ABSTRACT

Disclosed is a cover including a receiving portion having a space defined for receiving an electronic device, a covering portion, and a hinge portion connecting the receiving portion and the covering portion and allowing the covering portion to pivot. The covering portion includes, in a state in which the covering portion is pivoted in a specified direction about the hinge portion to at least partially cover the space, a light guiding member disposed on the first surface for guiding light, and an outer cover layer disposed on a second surface opposite to the first surface. In addition, various embodiments understood through the specification are possible.

14 Claims, 13 Drawing Sheets

(51) Int. Cl.
*F21V 8/00* (2006.01)
*G02B 6/10* (2006.01)

(52) U.S. Cl.
CPC ... *A45C 2011/001* (2013.01); *A45C 2011/002* (2013.01); *A45C 2011/003* (2013.01)

(58) Field of Classification Search
CPC .... A45F 2200/0508; A45F 2200/00516; A45F 2200/00525; H04B 1/3888; H04M 1/04; G02B 6/0046
See application file for complete search history.

(56) References Cited

U.S. PATENT DOCUMENTS

| | | | | |
|---|---|---|---|---|
| 8,428,644 | B1 * | 4/2013 | Harooni | H04B 1/3888 |
| | | | | 455/550.1 |
| 8,596,805 | B2 * | 12/2013 | Infanti | A45C 15/06 |
| | | | | 362/88 |
| 8,665,044 | B2 * | 3/2014 | Lauder | G06F 1/1626 |
| | | | | 335/219 |
| 8,976,512 | B2 * | 3/2015 | Richardson | H04M 1/185 |
| | | | | 361/679.01 |
| 9,114,923 | B2 * | 8/2015 | Richardson | B65D 81/05 |
| 9,118,195 | B2 * | 8/2015 | Foster | H02J 7/0044 |
| 9,531,422 | B2 * | 12/2016 | Jang | H04B 1/3888 |
| 9,729,208 | B2 * | 8/2017 | Del Toro | G06F 1/1628 |
| 9,768,824 | B2 * | 9/2017 | Jang | H04M 1/04 |
| 9,864,413 | B2 * | 1/2018 | Lin | G06F 1/1628 |
| 9,892,602 | B2 * | 2/2018 | Sartee | G08B 5/36 |
| 9,906,257 | B2 | 2/2018 | Choi | |
| 10,107,952 | B2 * | 10/2018 | Lim | G02B 6/0083 |
| 10,175,411 | B2 * | 1/2019 | Tang | G02B 6/0095 |
| 10,310,157 | B2 * | 6/2019 | Rasmussen | G02B 6/0008 |
| 10,356,238 | B2 * | 7/2019 | Kim | H04M 1/0245 |
| D895,594 | S * | 9/2020 | Kim | D14/250 |
| 2009/0003014 | A1 * | 1/2009 | Jablonski | A43B 3/0005 |
| | | | | 362/602 |
| 2010/0128494 | A1 * | 5/2010 | Moon | G02B 6/0088 |
| | | | | 362/605 |
| 2011/0266291 | A1 * | 11/2011 | Fan | H04B 1/3888 |
| | | | | 220/669 |
| 2012/0261306 | A1 * | 10/2012 | Richardson | H01F 38/14 |
| | | | | 206/778 |
| 2012/0309474 | A1 * | 12/2012 | Walker | H04B 1/3888 |
| | | | | 455/575.8 |
| 2013/0331156 | A1 * | 12/2013 | Lui | A45C 11/00 |
| | | | | 455/575.8 |
| 2014/0128131 | A1 | 5/2014 | Sin | |
| 2014/0367467 | A1 * | 12/2014 | Melbrod | G06K 19/005 |
| | | | | 235/435 |
| 2015/0185408 | A1 * | 7/2015 | Hsu | G02B 6/0055 |
| | | | | 362/606 |
| 2016/0149290 | A1 | 5/2016 | Park et al. | |
| 2016/0226547 | A1 * | 8/2016 | Choi | H04B 1/3888 |
| 2016/0241687 | A1 | 8/2016 | Son | |
| 2017/0141806 | A1 * | 5/2017 | Kuhl | H04M 1/7246 |
| 2017/0300085 | A1 * | 10/2017 | Hintermann | A45F 5/00 |
| 2021/0311360 | A1 * | 10/2021 | Kim | A45C 11/00 |
| 2022/0007533 | A1 * | 1/2022 | Wu | C25D 13/04 |
| 2022/0007804 | A1 * | 1/2022 | Kim | A45C 13/002 |

FOREIGN PATENT DOCUMENTS

| | | | | |
|---|---|---|---|---|
| CN | 203278923 U | * | 11/2013 | |
| EP | 2882171 A1 | | 6/2015 | |
| EP | 2532265 B1 | * | 4/2019 | ............ A45C 11/00 |
| GB | 2381986 A | * | 5/2003 | ............ H04M 1/22 |
| JP | 2014-093770 A | | 5/2014 | |
| KR | 101216854 B1 | * | 12/2012 | ............ A45C 11/00 |
| KR | 10-2014-0057126 A | | 5/2014 | |
| KR | 10-2015-0009304 A | | 1/2015 | |
| KR | 10-2016-0019333 A | | 2/2016 | |
| KR | 10-2016-0095506 A | | 8/2016 | |
| WO | WO-2013168847 A1 | * | 11/2013 | ............ A45C 11/00 |
| WO | WO-2020113921 A1 | * | 6/2020 | ............ H04M 1/02 |

OTHER PUBLICATIONS

International Search Report dated Apr. 6, 2018 in connection with International Patent Application No. PCT/KR2017/015553, 2 pages.

* cited by examiner

COVER AND ELECTRONIC DEVICE HAVING SAME

CROSS-REFERENCE TO RELATED APPLICATIONS

This application is a 371 of International Application No. PCT/KR2017/015553 filed on Dec. 27, 2017, which claims priority to Korean Patent Application No. 10-2017-0001236 filed on Jan. 4, 2017, the disclosures of which are herein incorporated by reference in their entirety.

BACKGROUND

1. Field

Embodiments disclosed herein relate to a cover and an electronic device having the same.

2. Description of Related Art

An electronic device such as a smart phone and the like may have a cover for protecting the electronic device from an external impact and the like. For example, the electronic device may be coupled to a cover that may be hinged such that a display disposed on a front surface of the electronic device may be opened and closed. This allows a user to open the cover to see a screen output via the display. Further, the user may close the cover when not using the electronic device to protect the display.

Further, the electronic device may notify the user of various events (e.g., a phone call receiving event, a message receiving event, a schedule notifying event, and the like) that occur at the electronic device via the screen output on the display. Accordingly, the cover coupled with the electronic device may have some regions thereof that are transparent in order to expose some regions of the display to outside while the display is covered by the cover.

However, the transparent region defined on the cover may be outstanding compared to the other regions, thereby reducing usability and aesthetic feel of the cover.

Embodiments disclosed herein may provide a cover and an electronic device to provide a notification to a user in response to various events generated on the electronic device using a light guiding member disposed on an inner surface of the cover facing a display and guiding light emitted from the display.

SUMMARY

A cover according to one embodiment disclosed herein may include a receiving portion having a receiving space having a space for receiving an electronic device, a covering portion, and a hinge portion connecting the receiving portion and the covering portion and allowing the covering portion to pivot. The covering portion may include, in a state in which the covering portion is pivoted in a specified direction about the hinge portion to at least partially cover the space, a light guiding member disposed on a first surface for guiding light, and an outer cover layer disposed on a second surface opposite to the first surface.

Further, an electronic device according to one embodiment disclosed herein may include a display for emitting light to outside, a processor electrically connected to the display, and a memory electrically connected to the processor. The processor may determine whether a cover to be coupled covers at least one surface of the display via at least one sensor disposed in the electronic device and control the display to emit the light to the outside in response to a specified event occurred when the cover at least partially covers the display.

According to embodiments disclosed herein, the light guiding member guiding the light emitted from the display is disposed on the inner surface of the cover such that an appearance of the cover may have a sense of unity.

Further, according to embodiments disclosed herein, the light emitted from the display is changed into various shapes via the light guiding member such that the aesthetic feel may be increased when providing a notification.

Further, according to embodiments disclosed herein, the light emitted from the display may be used to provide various notification effects by only changing a screen output through the display.

In addition, various effects may be provided that are directly or indirectly understood through the disclosure.

DETAILED DESCRIPTION

Figure 1:
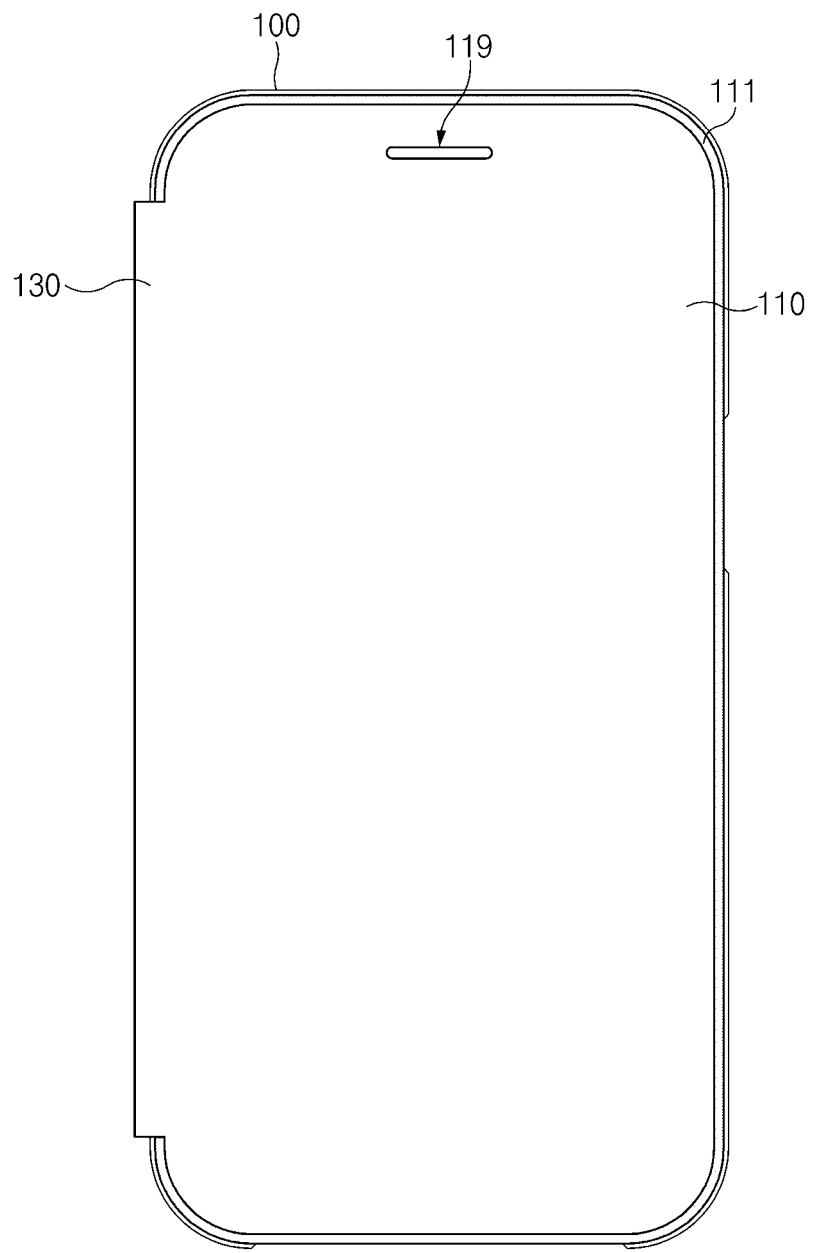
FIG. 1 is a front view of an electronic device in a state in which a cover according to an embodiment is closed.

Hereinafter, various embodiments of the disclosure will be described with reference to accompanying drawings. Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device.

An electronic device according to various embodiments of the disclosure may include at least one of, for example, smartphones, tablet PCs, mobile phones, image phones, e-book readers, desktop PCs, laptop PCs, netbook computers, workstations, servers, PDAs, portable multimedia devices (PMPs), MP3 players, medical devices, cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or an implantable circuit. According to some embodiments, the electronic device may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, media boxes (e.g.: a Samsung HomeSync™, an apple TV™, of a Google TV™), game consoles (e.g.: an Xbox™, a PlayStation™), electronic dictionaries, electronic keys, camcorders, or electronic picture frames.

According to another embodiment, the electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MM), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automated teller machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures or vehicles, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. In various embodiments, the electronic device may be flexible or combinations of two or more of the various devices described above. Furthermore, the electronic device according to an embodiment of the disclosure may not be limited to the above-described electronic devices. In the disclosure, the term "user" may refer to a person who uses an electronic device or may refer to a device (e.g., an artificial intelligence electronic device) that uses the electronic device.

Figure 2:
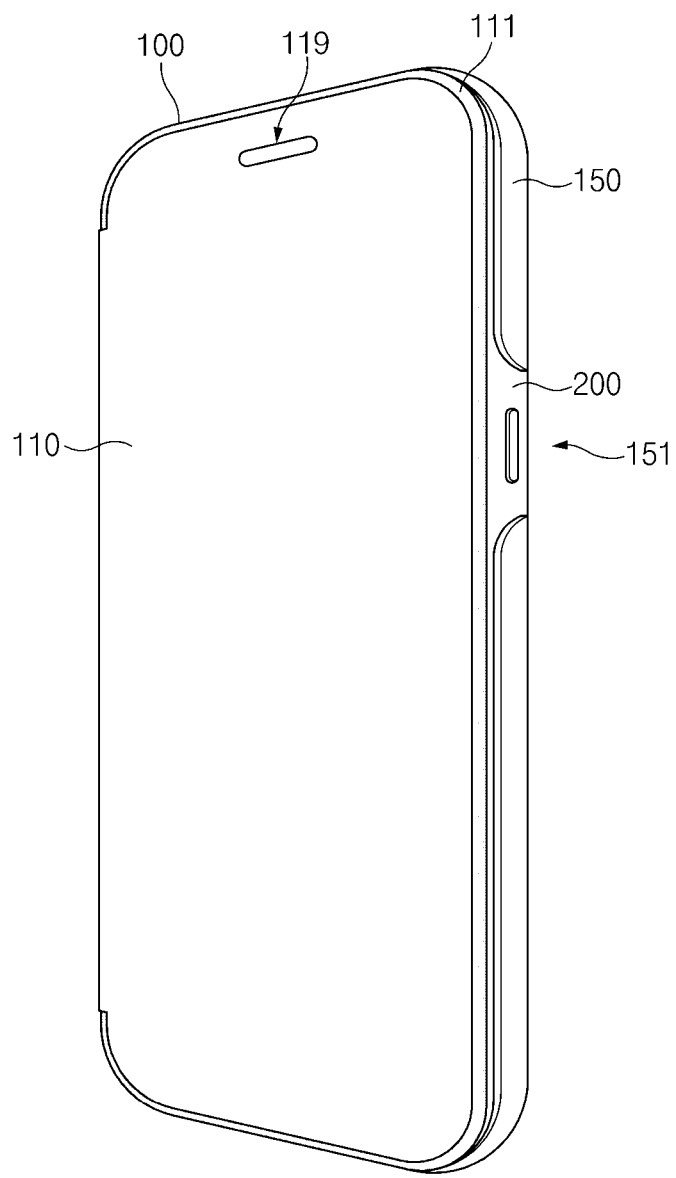
FIG. 2 is a perspective view of an electronic device in a state in which a cover according to an embodiment is closed.

FIG. 1 is a front view of an electronic device in a state in which a cover according to an embodiment is closed. FIG. 2 is a perspective view of an electronic device in a state in which a cover according to an embodiment is closed.

Referring to FIGS. 1 and 2, an electronic device 200 may have a cover 100 for protecting the electronic device 200 from an external impact or the like. In one embodiment, the cover 100 may be coupled to the electronic device 200 in a hinge manner such that a display disposed on at least one surface of the electronic device 200 may be opened or closed.

The cover 100 may include a covering portion 110, a hinge portion 130, and a receiving portion 150. The covering portion 110 may be connected to the hinge portion 130 such that a front surface of the electronic device 200 may be opened or closed. The covering portion 110 may be in a shape substantially the same as a shape of an appearance of the front surface of the electronic device 200. In addition, the covering portion 110 may be in a size substantially the same as a size of the front surface of the electronic device 200. However, the shape and size of the covering portion 110 are not limited thereto. When the covering portion 110 covers at least a portion of the front surface of the electronic device 200, especially covers the display, any shape and size thereof may be consistent with the spirit of the disclosure.

The covering portion 110 may contain a light guiding member 111 for guiding light emitted from the display. The light guiding member 111 may be disposed on an inner surface of the covering portion 110, that is, a surface facing away from the display. Further, a portion of the light guiding member 111 may be exposed to outside. In the illustrated drawing, the light guiding member 111 is illustrated as being exposed to the outside from an edge region of the covering portion 110. Accordingly, the light emitted from the display may be refracted and diffused along the light guiding member 111 and released to the outside. The light guiding member 111 may be made of, for example, a fluorescent acrylic material, a light diffusing acrylic material, a transparent acrylic material, a polycarbonate (PC) material, an optical fiber material, or the like.

In one embodiment, the covering portion 110 may have the edge region, at least a portion of which is curved. For example, at least some of a top left end, a top right end, a bottom left end, or a bottom right end of the covering portion 110 may be in a curved shape.

In one embodiment, the covering portion 110 may have a hole 119 defined in a portion thereof. In one example, the covering portion 110 may have the hole 119 defined at a position aligned with a speaker such that sound output from the speaker (e.g., a receiver) of the electronic device 200 may be emitted to the outside.

The hinge portion 130 may extend from one side surface of the covering portion 110 and be connected to the receiving portion 150. The hinge portion 130 may cover an appearance of the one side surface of the electronic device 200 and may be made of a flexible material such that the covering portion 110 may be pivoted. For example, when the hinge portion 130 is unfolded, the covering portion 110 may maintain an opened state (e.g., a state in which the front surface of the electronic device 200 is not covered), and when the hinge portion 130 is bent, the covering portion 110 may maintain a closed state (e.g., a state in which the front surface of the electronic device 200 is closed). The hinge portion 130 may be made of, for example, a polyurethane (PU) material.

The receiving portion 150 may provide a space in which the electronic device 200 may be received. The receiving portion 150 may be connected to the hinge portion 130 and may cover an appearance of a rear surface of the electronic device 200. In an embodiment, the receiving portion 150 may have at least one side wall in the edge region to cover a portion of an appearance of the side surface of the electronic device 200. For example, the receiving portion 150 may have the side wall on at least one of a top end, a bottom end, a left end, or a right end thereof. In an embodiment, the receiving portion 150 may include a first side wall connecting the top left end, the top end, and the top right end and a second side wall connecting the bottom left end, the bottom end, and the bottom right end. In this case, the first side wall may have a portion connecting the top left end and the top end and a portion connecting the top end and the top right end in a form of a curved surface. In addition, the second sidewall may have a portion connecting the bottom left end and the bottom end and a portion connecting the bottom end and the bottom right end in a form of a curved surface. In addition, a space 151 may be defined between the first side wall and the second side wall such that the first side wall and the second side wall are separated from each other by a predetermined distance. When the electronic device 200 is received in the receiving portion 150, a physical key or the like disposed on the side surface of the electronic device 200 may be positioned in the space 151. The receiving portion 150 may be made of, for example, a polyurethane material, and a portion of the receiving portion 150, for example, the side wall thereof may be made of a material such as acrylic material, polycarbonate, or the like.

In one embodiment, a module for detecting whether or not the electronic device 200 is received may be disposed in the receiving portion 150. In one example, an NFC chip is disposed in the receiving portion 150, and a communication circuit for communicating with the NFC chip may be contained in the electronic device 200. Thus, when a specified event (e.g., a phone call receiving event, a message receiving event, a schedule notifying event, or the like) occurs on the electronic device 200 in a state in which the electronic device 200 is received in the receiving portion 150 and the covering portion 110 is covering the display of the electronic device 200, the electronic device 200 may emit the light through the display and the emitted light may be refracted and diffused along the light guiding member 111 disposed on the inner surface of the covering portion 110 and released to the outside.

In one embodiment, the electronic device 200 (e.g., a processor disposed within the electronic device 200) may obtain information related to the cover 100 from the NFC chip disposed in the receiving portion 150 via the communication circuit. In one example, the electronic device 200 may receive information about a type of the cover 100, for example, a color of an appearance of the outer surface of the cover 100 (e.g., a color of the covering portion 110, hinge portion 130, receiving portion 150, or light guiding member 111, or the like) from the NFC chip. In addition, when an event occurred on the electronic device 200 is notified, the electronic device 200 may set color, brightness of the light emitted from the display, an animation effect using the light, and the like to be different based on the obtained information about the type of the cover 100.

Figure 3:
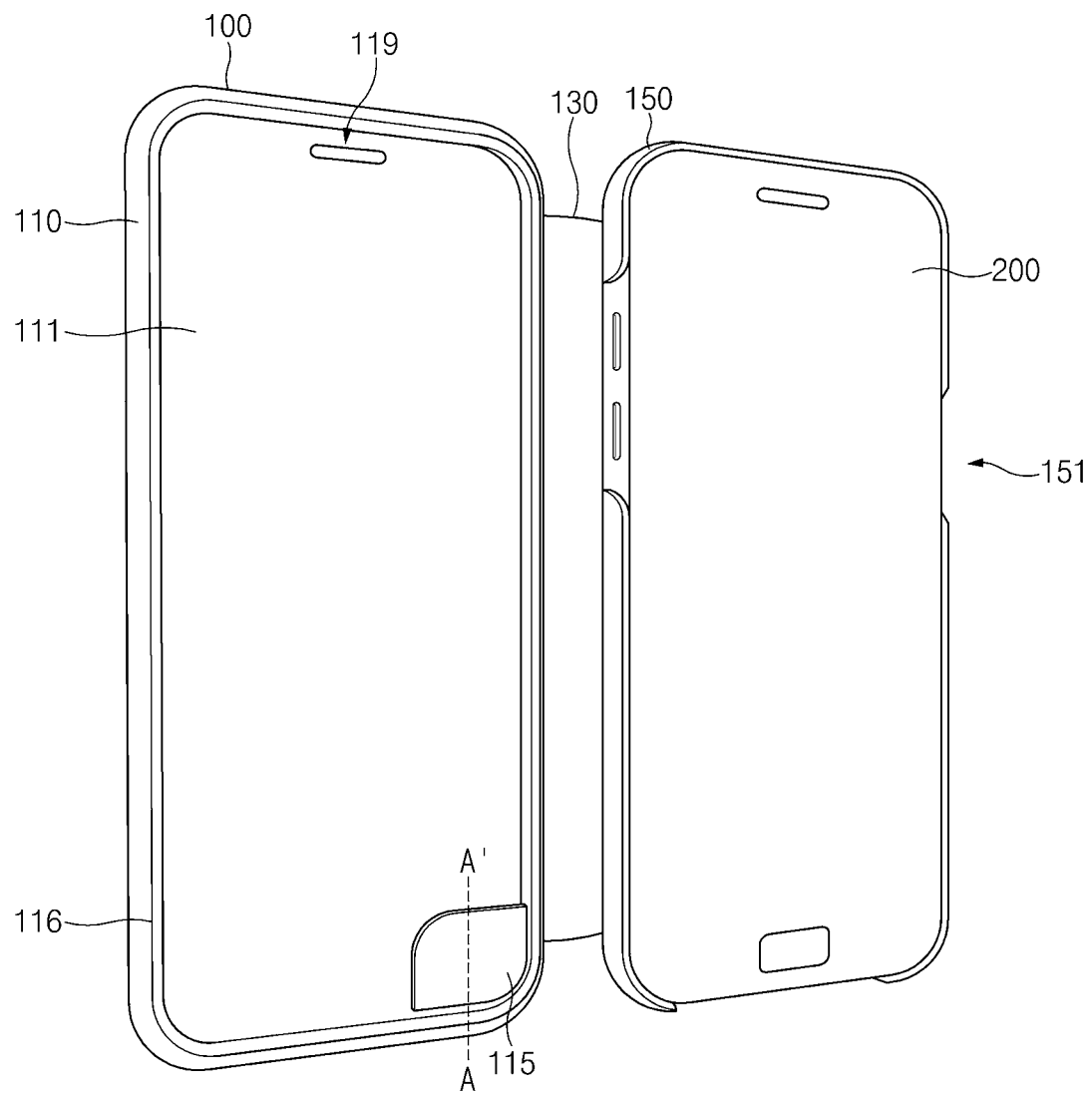
FIG. 3 is a perspective view of an electronic device in a state in which a cover according to an embodiment is opened.

FIG. 3 is a perspective view of an electronic device in a state in which a cover according to an embodiment is opened.

Referring to FIG. 3, the cover 100 may include the receiving portion 150 in which the electronic device 200 is received, the covering portion 110 disposed to cover at least one surface of the electronic device 200 in an openable and closable manner, and the hinge portion 130 connecting the receiving portion 150 and the covering portion 110. In the illustrated drawing, the electronic device 200 is illustrated as being inserted and received between the side walls formed on the receiving portion 150 and the hinge portion 130 is illustrated as being unfolded such that the covering portion 110 is opened.

The covering portion 110 may have the light guiding member 111 on the surface thereof facing away from the display of the electronic device 200. For example, the light guiding member 111 may be disposed on the inner surface of the covering portion 110. The covering portion 110 may guide the light emitted from the display of the electronic device 200. For example, the light emitted from the display may be refracted and diffused along the light guiding member 111 and emitted to the outside.

In one embodiment, the light guiding member 111 may be disposed to be embedded in the inner surface of the covering portion 110. A thickness of a portion of the light guiding member 111 disposed on the edge region of the inner surface of the covering portion 110 may be larger than a thickness of a central region of the light guiding member 111. For example, as shown in FIG. 3, the light guiding member 111 may be disposed on the inner surface of the covering portion 110 substantially in a plate shape and may have a protruding edge region.

In one embodiment, the light guiding member 111 may be integrally formed, or may include a plurality of light guiding members 111 bonded with each other. In one example, the light guiding member 111 may include a first light guiding member, a second light guiding member, a third light guiding member, and a fourth light guiding member respectively disposed on upper, lower, left, and right sides of the covering portion 110 and bonded with each other. However, the number, arrangement position, and bonding state of the light guiding members 111 are not limited thereto. According to various embodiments, at least one of the plurality of light guiding members 111 may be disposed on the inner surface of the covering portion 110 in a separated state.

In one embodiment, a contact prevention member 116 may be disposed in an edge region of the light guiding member 111. For example, the contact prevention member 116 may be disposed in the protruding edge region of the light guiding member 111 to prevent the light guiding member 111 from being in contact with the display of the electronic device 200 when the covering portion 110 covers the front surface of the electronic device 200. Accordingly, the light guiding member 111 may be prevented from impacting the display of the electronic device 200 in a process of closing the covering portion 110. The contact prevention member 116 may be made of, for example, a rubber material having elasticity or the like.

In one embodiment, the contact prevention member 116 may be in a form of a long strip. In one example, the contact prevention member 116 may be in the form of the long strip and attached along the edge region of the light guiding member 111. In this case, the contact prevention member 116 may not be attached to the central region of the light guiding member 111. In another example, the contact prevention member 116 may include a plurality of small strips and the small strips may be spaced apart from each other and disposed in the edge region of the light guiding member 111.

In one embodiment, a magnetic substance (not shown) may be mounted in a portion of the light guiding member 111 and a sheet 115 may be attached to cover the magnetic substance. A magnetic field generated by the magnetic substance may be sensed via a hall sensor disposed in the electronic device 200. For example, the hall sensor mounted inside the electronic device 200 may sense the magnetic field generated by the magnetic substance using a property of a voltage changing based on an intensity of the magnetic field when the covering portion 110 in which the magnetic substance is received covers one surface of the electronic device 200. When the intensity of the magnetic field is equal to or greater than a specified intensity, the hall sensor may determine that the cover 100 is in the closed state.

Figure 4:
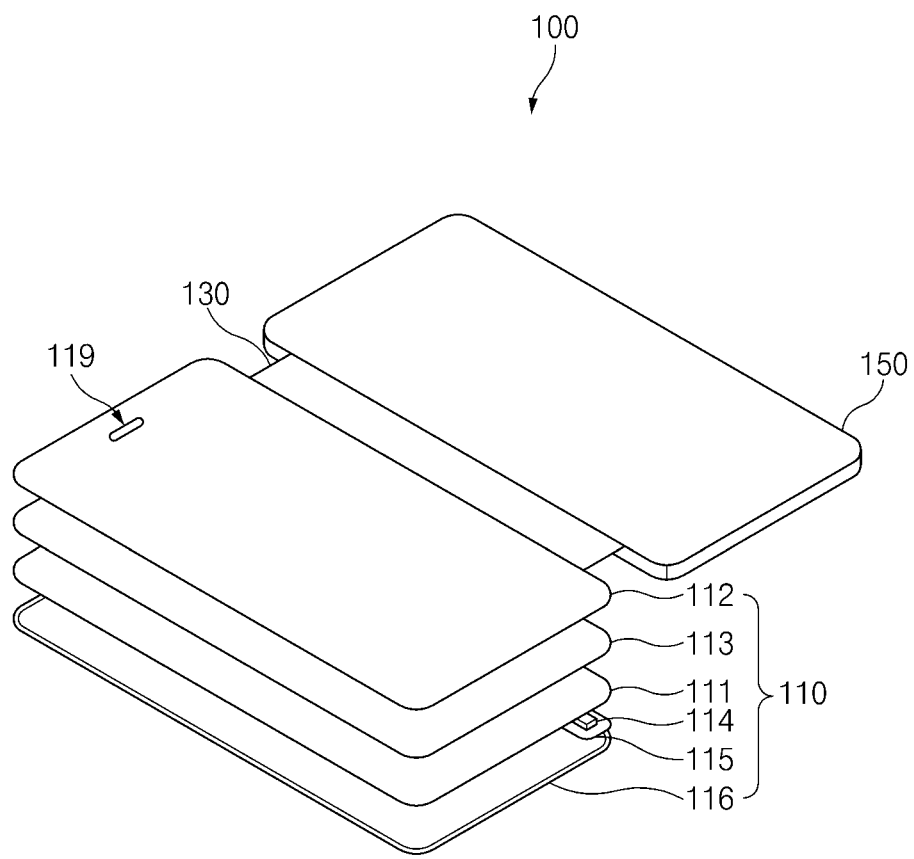
FIG. 4 is an exploded perspective view of a cover according to an embodiment.

FIG. 4 is an exploded perspective view of a cover according to an embodiment. In addition, FIG. 5 is a cross-sectional view taken along a line A-A' in FIG. 3 according to an embodiment.

Figure 5:
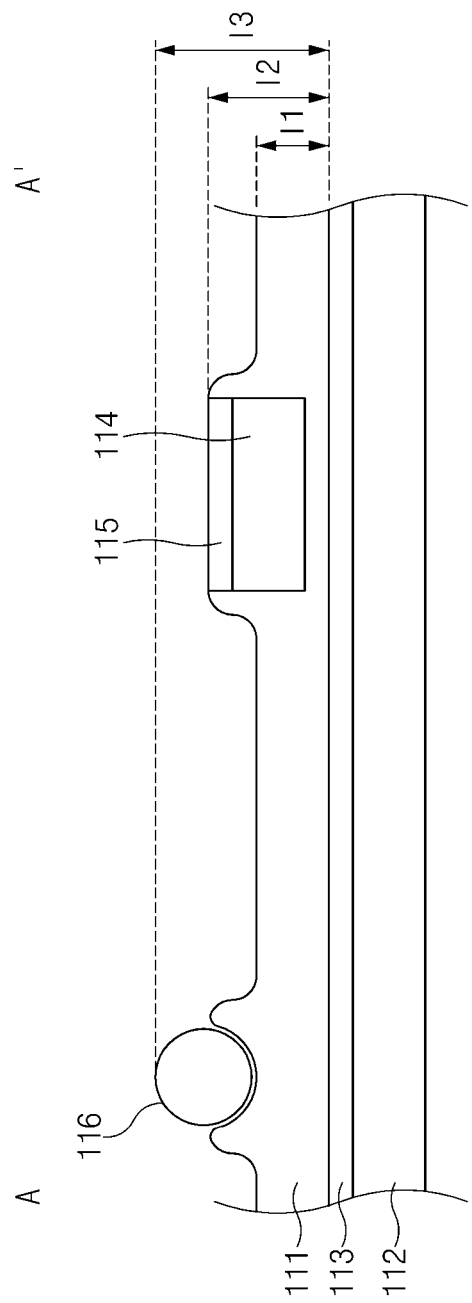
FIG. 5 is a cross-sectional view taken along a line A-A' in FIG. 3 according to an embodiment.

Referring to FIGS. 4 and 5, the covering portion 110 of the cover 100 may include an outer cover layer 112 for protecting the electronic device 200 from an external impact at an outer surface when the electronic device 200 is covered, the light guiding member 111 for guiding the light emitted from the display of the electronic device 200 in an inner surface when the electronic device 200 is covered, a bonding layer 113 for bonding the outer cover layer 112 and the light guiding member 111 with each other, a magnetic substance 114 received in a portion of the light guiding member 111, the sheet 115 for covering the magnetic substance 114, and the contact prevention member 116 disposed to protrude from the edge region of the light guiding member 111.

The outer cover layer 112 may be integrally formed with the receiving portion 150 and the hinge portion 130. The outer cover layer 112 may be made of a material same as the material of the receiving portion 150 and the hinge portion 130. The outer cover layer 112 may be made of, for example, a polyurethane material. In one embodiment, an area of the outer cover layer 112 may be smaller than an area of the light guiding member 111. Accordingly, the portion of the light guiding member 111 disposed on the inner surface of the covering portion 110 may be exposed to the outside in a front view of the covering portion 110.

In one embodiment, the light guiding member 111 may be disposed to be embedded in the inner surface of the covering portion 110. For example, the light guiding member 111 may be substantially in the single plate shape and have the protruding edge region. In addition, a region of the light guiding member 111 in which the magnetic substance 114 is received may be recessed inwardly. Further, an edge of the region in which the magnetic substance 114 is received may protrude from a peripheral region. For example, as shown in FIG. 5, the light guiding member 111 is provided in a shape of a plate substantially having a first thickness 11, and the edge of the region in which the magnetic substance 114 is received may have a second thickness 12 relatively larger than the first thickness. Further, the edge of the region in which the contact prevention member 116 is received may have a thickness relatively larger than the first thickness. The light guiding member 111 may be made of a material that may guide the light emitted from the display of the electronic device 200, such as, the fluorescent acrylic material, the light diffusing acrylic material, the transparent acrylic material, the polycarbonate (PC) material, the optical fiber material, or the like.

The bonding layer 113 may be made of a material that may bond the outer cover layer 112 and the light guiding member 111 with each other. The bonding layer 113 may be made of, for example, a thermoplastic resin used for hot melt. However, the material of the bonding layer 113 is not limited thereto.

The magnetic substance 114 may be disposed in the portion of the light guiding member 111. The region in which the magnetic substance 114 is disposed may correspond to a region in which the hall sensor, which is disposed in the electronic device 200, is disposed. For example, when the hall sensor is disposed at a bottom left end of the electronic device 200, the magnetic substance 114 is preferably disposed at a bottom right end of the light guiding member 111 in a view from an inner surface of the covering portion 110 while the covering portion 110 is opened. That is, the magnetic substance 114 is preferably disposed in a region closest to the hall sensor when the magnetic substance 114 and the hall sensor are facing each other.

The sheet 115 may cover the magnetic substance 114 received in the light guiding member 111 to prevent the magnetic substance 114 from being separated to the outside. The sheet 115 may be attached such that the sheet 115 is substantially flush with the edge of the region of the light guiding member 111 in which the magnetic substance 114 is received. For example, a vertical level 12 from a bottom surface of the light guiding member 111 to an end of the edge of the region in which the magnetic substance 114 is received may substantially flush with a vertical level from the bottom surface of the light guiding member 111 to an outer surface of the sheet 115. In some embodiments, the sheet 115 may be disposed to cover the edge of the region of the light guiding member 111 in which the magnetic substance 114 is received. The sheet 115 may be made of, for example, a polycarbonate.

The contact prevention member 116 may be disposed in the edge region of the light guiding member 111. In addition, the contact prevention member 116 may be further protruded from the light guiding member 111 than other components (e.g., the magnetic substance 114, the sheet 115, or the like) that are received in the light guiding member 111. For example, a vertical level 13 from the bottom surface of the light guiding member 111 to an outer surface of the contact prevention member 116 may be relatively larger than a vertical level from the bottom surface of the light guiding member 111 to an outer surface of the other component. Accordingly, when one surface of the electronic device 200 is covered with the covering portion 110, the contact prevention member 116 is brought into contact with the one surface of the electronic device 200, so that the light guiding member 111 and other components received in the light guiding member 111 may not be in contact with the one surface of the electronic device 200. The contact prevention member 116 may be made of, for example, a rubber material having elasticity.

Figure 6:
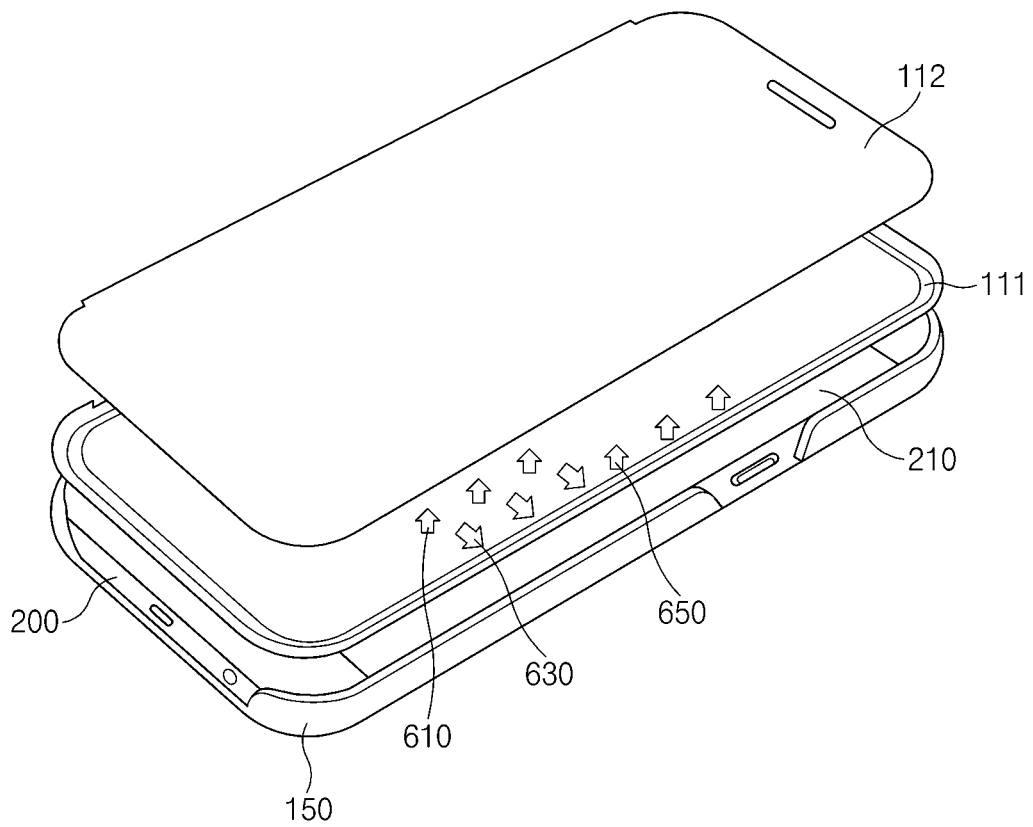
FIG. 6 is a diagram for illustrating a movement of light emitted from a display according to an embodiment.
Figure 7:
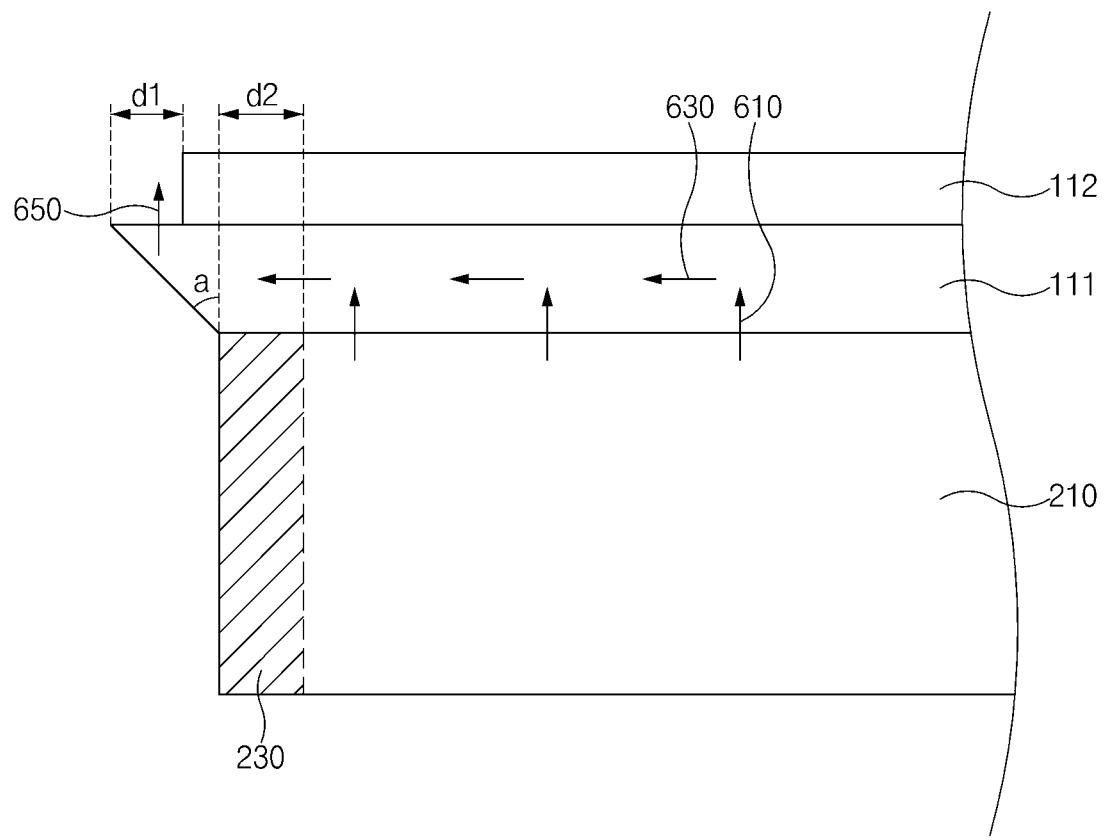
FIG. 7 is a view for illustrating an arrangement of a display and a cover according to an embodiment.

FIG. 6 is a diagram for illustrating a movement of light emitted from a display according to an embodiment. FIG. 7 is a view for illustrating an arrangement of a display and a cover according to an embodiment.

Referring to FIGS. 6 and 7, when the light is emitted from a display 210 of the electronic device 200 received in the receiving portion 150 of the cover 100 in a first direction 610 (e.g., a top end direction), the light is diffused in a second direction 630 (e.g., a side surface direction) along the light guiding member 111 disposed on the inner surface of the covering portion 110 of the cover 100 that covers the display 210, and the light may be refracted in a third direction 650 (e.g., the top end direction) by an inclined surface formed at an end of the edge of the light guiding member 111 and released to the outside.

In one embodiment, the display 210 may include a non-display region 230 (e.g., a black matrix (BM) region). The non-display region 230 may be disposed in an edge region of the display 210. The light guiding member 111 covering the display 210 may protrude further than the display 210 in the side surface direction such that the light emitted from the display 210 is not directly emitted to the outside. Further, in a front view of the light guiding member 111, an inner end of the inclined surface is preferably aligned with an outer edge of the non-display region 230 of the display 210 such that the inclined surface formed at the end of the edge of the light guiding member 111 is not overlapped with a display region (a region excluding the non-display region 230) of the display 210. That is, a distance d2 between the inclined surface and the display region of the display 210 preferably is maintained to be a distance corresponding to a thickness of the non-display region 230 of the display 210.

In one embodiment, the end of the edge of the light guiding member 111 may include the inclined surface. The end of the edge of the light guiding member 111 may include an inclined surface formed at a specified angle a (e.g., about 45 degrees) from a surface facing the display 210. In other words, a surface of the light guiding member 111 facing the outer cover layer 112 of the covering portion 110 protrudes in the side surface direction further than the surface of the light guiding member 111 facing the display 210. Therefore, the outer surface of the light guiding member 111 may be inclined.

In one embodiment, the light guiding member 111 may protrude by a specified length d1 further than the outer cover layer 112 when viewed the covering portion 110 from the front. Accordingly, the light may be emitted to the outside through a region of the protruded length d1.

Figure 8:
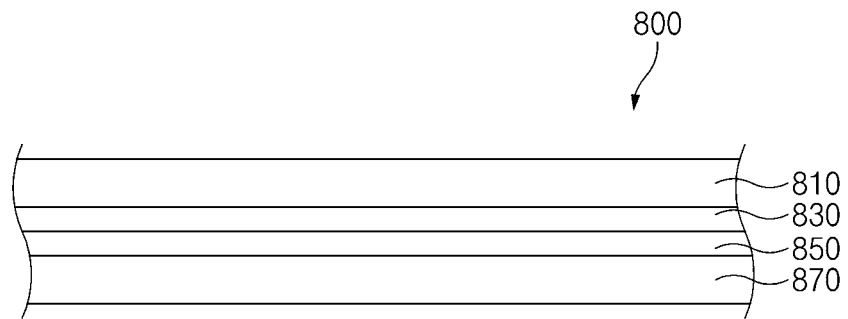
FIG. 8 is a view illustrating a stacked structure of a portion of a cover according to an embodiment.

FIG. 8 is a view illustrating a stacked structure of a portion of a cover according to an embodiment.

Referring to FIG. 8, a covering portion (e.g., the covering portion 110) of a cover 800 (e.g., the cover 100) may include an outer cover layer 810 for defining an outer surface of the covering portion and protecting the electronic device 200 from an external impact when the electronic device 200 is covered, a light guiding member 870 for defining an inner surface of the covering portion and guiding the light emitted from the display of the electronic device 200 when the electronic device 200 is covered, a film layer 850 disposed between the light guiding member 870 and the outer cover layer 810, and a bonding layer 830 for bonding the film layer 850 and the outer cover layer 810 with each other. That is, the covering portion 110 may further include the film layer 850 in addition to the components of the covering portion 110 shown in FIG. 4.

The film layer 850 may prevent the light guiding member 870 from being viewable to the outside in a region where the light guiding member 870 and the outer cover layer 810 are overlapped with each other due to the reflection of the light refracted and diffused along the light guiding member 870 at the outer cover layer 810. That is, the film layer 850 may be disposed for light reflection and shielding functions.

In one embodiment, the film layer 850 may be post-processed using a fluorescent paint sprayer. When the film layer 850 is further disposed, the light guiding member 870 may be made of a material having a color varying based on a color of the film layer 850. In one example, when the film layer 850 is in a fluorescent color, the light guiding member 870 may be made of a transparent acrylic material. In some embodiments, when the light guiding member 870 has a transparent or light color (e.g., milky color), a color of the light emitted through the display of the electronic device 200 may be projected to the outside in a substantially intact manner.

Figure 9A:
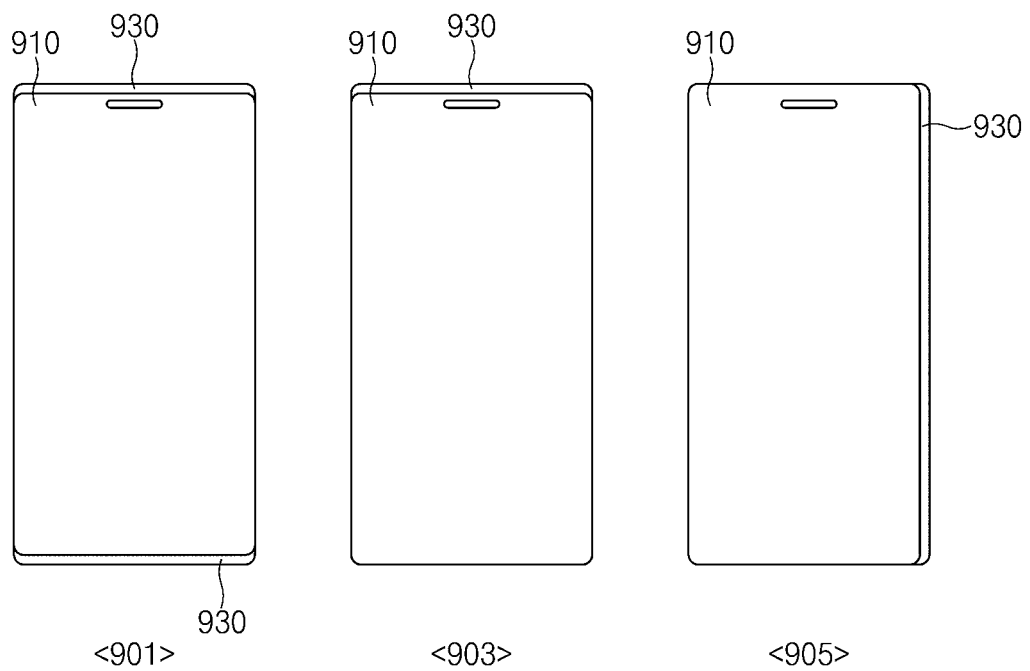
FIG. 9A is a view for illustrating a notification providing region of a cover according to an embodiment.

FIG. 9A is a view for illustrating a notification providing region of a cover according to an embodiment. Further, FIG. 9B is a view for illustrating another notification providing region of a cover according to an embodiment.

Figure 9B:
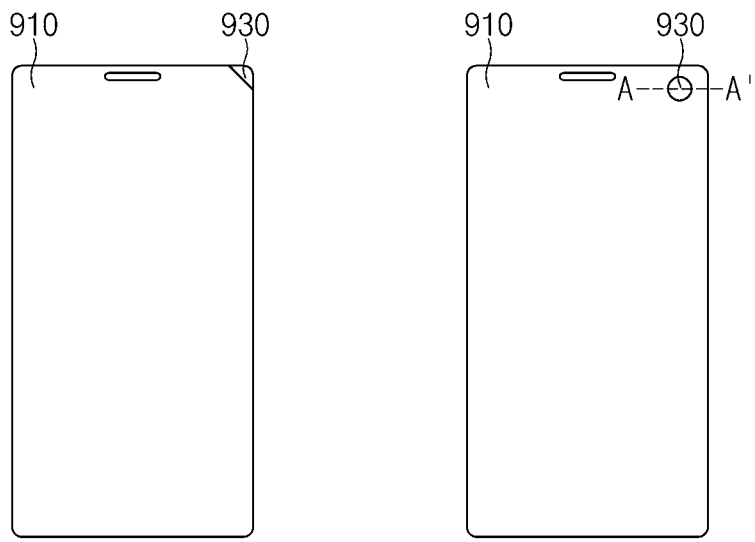
FIG. 9B is a view for illustrating another notification providing region of a cover according to an embodiment.

Referring to FIGS. 9A and 9B, in a cover (e.g., the cover 100 or 800), an outer cover layer 910 may have an area relatively smaller than an area of a light guiding member 930. Accordingly, in a front view of the cover (in a top view of a covering portion), a portion of the light guiding member 930 disposed on an inner surface of the covering portion may be exposed to the outside. For example, the light guiding member 930 may be exposed to the outside from top and bottom end regions of the covering portion as in a first state 901, only in the top end region as in a second state 903, or only in a right region as shown in a third state 905. However, a position at which the light guiding member 930 is exposed is not limited thereto. According to various embodiments, the light guiding member 930 may be exposed to the outside from at least one of the top end, bottom end, left, or right regions of the covering portion.

In some embodiments, the light guiding member 930 may be disposed only on an edge region of an inner surface of the covering portion, instead of being disposed to occupy most of the inner surface of the covering portion. For example, the light guiding member 930 may be disposed only on top end, bottom end, left, and right edge regions of the inner surface of the covering portion. Even in this case, in order to guide light emitted from a display of an electronic device (e.g., the electronic device 200), at least a portion of the light guiding member 930 may overlap with a display region of the display.

In one embodiment, the light guiding member 930 may be exposed to the outside in a long shape from one side edge of the covering portion as in FIG. 9A. Alternatively, the light guiding member 930 may be exposed to the outside from a corner of the covering portion or at a region adjacent to the corner as shown in FIG. 9B. In one example, the light guiding member 930 may be exposed to the outside from a top right corner of the covering portion, as in a fourth state 907. However, a corner at which the light guiding member 930 is exposed is not limited thereto. Further, the light guiding member 930 may be exposed to the outside from at least one of top right, top left, bottom left, or bottom right corners of the covering portion. In another example, the light guiding member 930 may be exposed to the outside from a region inwardly of the edge of the covering portion, as in a fifth state 909. For example, the light guiding member 930 may be exposed to the outside from a region adjacent to the corner of the covering portion. In this case, an outer cover layer of the covering portion may have an opening in the region where the light guiding member 930 is exposed. The stacking structure of the covering portion for this case will be described in FIG. 10.

Figure 10:
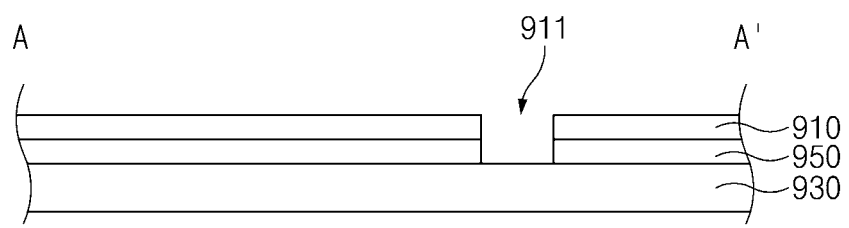
FIG. 10 is a cross-sectional view taken along a line A-A' in FIG. 9B according to an embodiment.

FIG. 10 is a cross-sectional view taken along a line A-A' in FIG. 9B according to an embodiment.

Referring to FIG. 10, the light guiding member 930 may be exposed to the outside from the region inwardly of the edge of the covering portion. For example, the light guiding member 930 may be exposed to the outside from a central portion of the covering portion or at a periphery portion between the central portion and the edge. An opening 911 may be defined in an outer cover layer 910 and a bonding layer 950 for bonding the outer cover layer 910 and the light guiding member 930 in order for the light guiding member 930 to be exposed from the region inwardly of the edge of the covering portion to the outside. Accordingly, a portion of the light guiding member 930 may be exposed to the outside through the opening 911 defined in the outer cover layer 910 and the bonding layer 950. Further, the light emitted from the display of the electronic device (e.g., the electronic device 200) may be refracted and diffused along the light guiding member 930, and may be emitted to the outside through the opening 911.

In one embodiment, a transparent material (e.g., a glass) may be disposed on the outer cover layer 910 and the bonding layer 950, instead of defining the opening 911 therein. For example, in a region of the outer cover layer 910 and the bonding layer 950 overlapping the exposed region of the light guiding member 930, each of the outer cover layer 910 and the bonding layer 950 may be made of the transparent material.

Figure 11A:
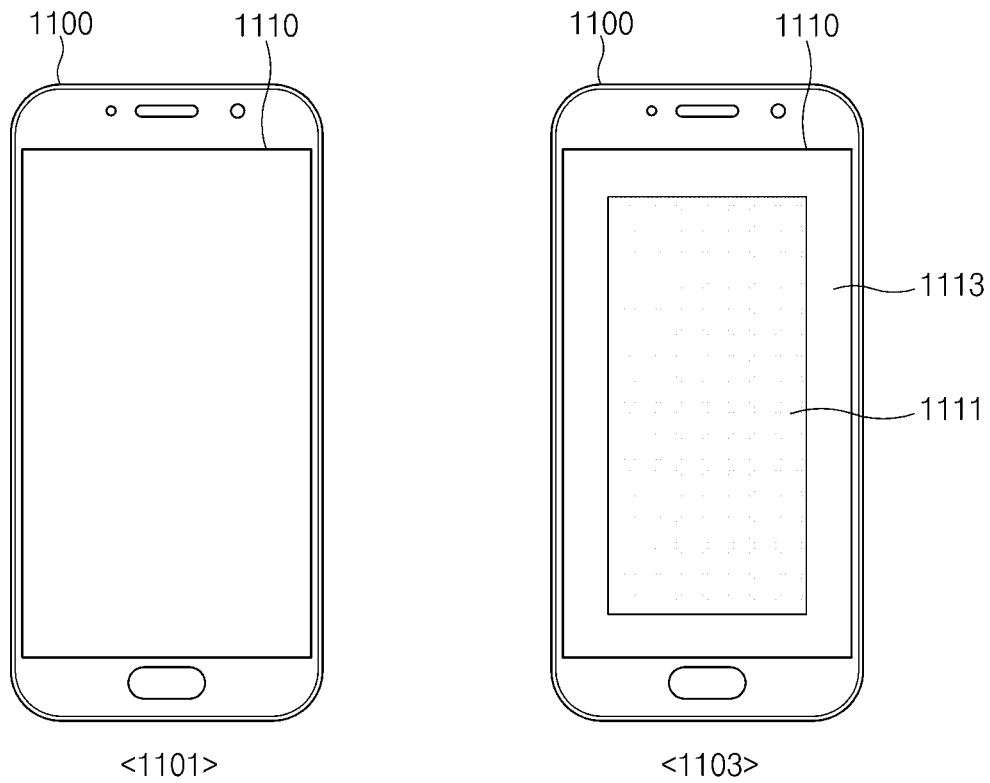
FIG. 11A is a view for illustrating a screen output state of a display according to an embodiment.

FIG. 11A is a view for illustrating a screen output state of a display according to an embodiment. Further, FIG. 11B is a view for illustrating another screen output state of a display according to an embodiment.

Figure 11B:
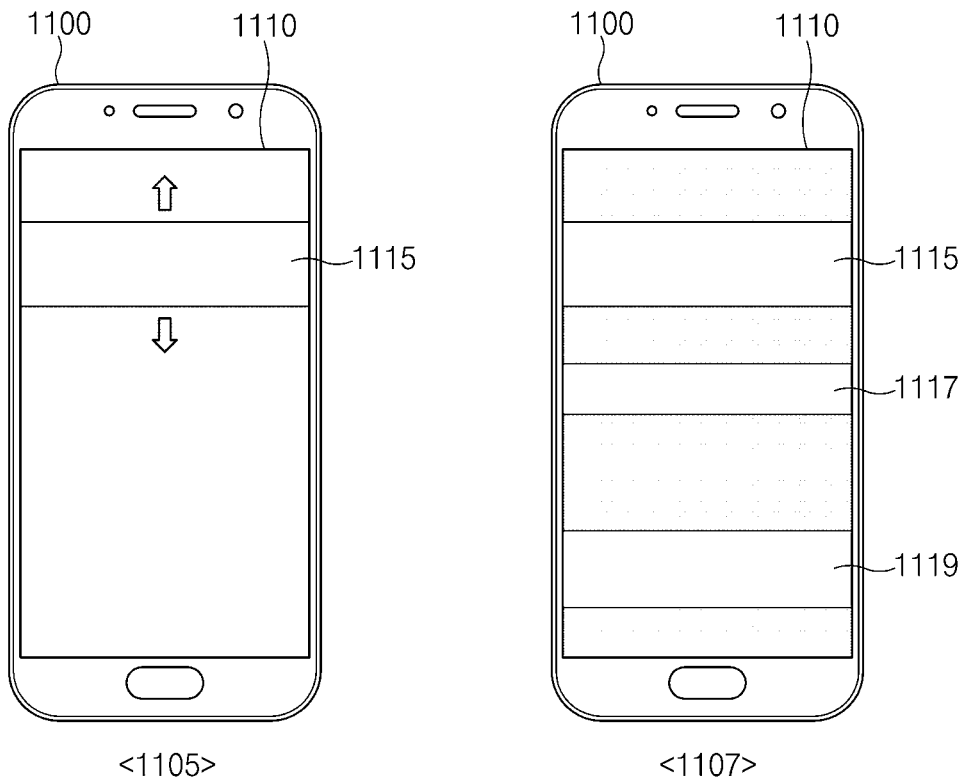
FIG. 11B is a view for illustrating another screen output state of a display according to an embodiment.

Referring to FIGS. 11A and 11B, when an electronic device 1100 (e.g., the electronic device 200) is received in a receiving portion (e.g., the receiving portion 150) of a cover (e.g., the cover 100), a communication circuit mounted in the electronic device 1100 communicates with an NFC chip disposed in the receiving portion such that the electronic device 1100 (e.g., a processor disposed in the electronic device 1100) may determine whether the cover is attached or detached. Further, when a covering portion (e.g., the covering portion 110) of the cover is closed while the electronic device 1100 is coupled to the cover, a hall sensor mounted in the electronic device 1100 may sense a magnetic field due to a magnetic substance received in the covering portion to determine whether the cover is opened or closed.

In one embodiment, when a specified event (e.g., a phone call receiving event, a message receiving event, a schedule notifying event, or the like) occurs while the electronic device 1100 is coupled to the cover and the covering portion of the cover is closed, the electronic device 1100 (e.g., the processor) may emit light through a display 1110. The light emitted through the display 1110 may be refracted and diffused to the outside along a light guiding member (e.g., the light guiding member 111) of the cover. When the light is emitted, various colors may be represented based on a color of the light guiding member and/or a color of a film layer covering the light guiding member. In some embodiments, the light guiding member simply guides the light, and the color represented externally may be determined by a color of the light emitted from the display 1110. In this case, the color of the light emitted from the display 1110 may be determined differently based on a color of an outer cover layer (e.g., the outer cover layer 112) of the cover. For example, the color of the light emitted from the display 1110 may be specified as a complementary color (or a contrast color) to the color of the outer cover layer such that the color of the light emitting to the outside may be more clearly recognized from the outside.

In one embodiment, when emitting the light through the display 1110, the electronic device 1100 may emit the light in a different form depending on a type of a generated event. For example, the electronic device 1100 may differently set the color of the light or a region of the display 1110 where the light is emitted depending on the type of the event. In one example, the electronic device 1100 may allow the light to be emitted in an entire region of the display 1110 as in a first state 1101 or only in a portion of the display 1110 as in a second state 1103. For example, the electronic device 1100 may allow the light to be emitted only in a region 1113 adjacent to a region where the light guiding member is disposed. In this case, the light may be emitted only in the region 1113 adjacent to the region where the light guiding member is disposed such that most region 1111 of the display 1110 may maintain an OFF state, thereby reducing power consumption.

In one embodiment, the electronic device 1100 may control the display 1110 to emit the light only in the specified color depending on the type of the generated event. For example, the electronic device 1100 may allow only one of display elements corresponding to red, green, and blue colors included in the display 1110 to emit the light in response to the occurrence of the event. In one example, when a phone call receiving event (e.g., a phone call from an external device is received) occurs, the electronic device 1100 only allow the display element corresponding to the red to emit the light. Further, when a message receiving event occurs (e.g., when a message is received from an external device), the electronic device 1100 only allow the display element corresponding to the green to emit the light. Further, when a schedule notifying event occurs (e.g., when it is determined that a schedule time has reached based on a schedule-related data stored in a memory), the electronic device 1100 only allows the display element corresponding to the blue to emit the light. However, the colors corresponding to the type of the event are not limited thereto. According to various embodiments, the display elements respectively corresponding to the colors may emit the light simultaneously such that at least two colors of the red, the green, or the blue may be mixed with each other when a specific event occurs.

In one embodiment, the electronic device 1100 may differently set the region where the display 1110 emits the light depending on the type of the generated event. For example, the electronic device 1100 may set ON/OFF of the display elements contained in the display 1110 differently from each other in response to the occurrence of the event to control the display 1110 such that regions where the light is emitted are different from each other. For example, when the phone call receiving event occurs, the electronic device 1100 allows only display elements arranged in an upper region of the display 1110 to emit the light. Further, when the message receiving event occurs, the electronic device 1100 allows only display elements arranged in a lower region of the display 1110 to emit the light. Further, when the schedule notifying event occurs, the electronic device 1100 allows only display elements arranged in left and right regions of the display 1110 to emit the light. However, depending on the type of the event, whether or not the display elements contained in the display 1110 emit the light is not limited thereto. According to various embodiments, the electronic device 1100 may allow all of the display elements contained in the display 1110 to emit the light when a specific event occurs. In some embodiments, a remainder except for display elements disposed in a central region of the display 1110, that is, only display elements disposed in an edge region may emit the light.

In one embodiment, when emitting the light through the display 1110, the electronic device 1100 may apply an animation effect depending on the type of the generated event. For example, the electronic device 1100 may change the region of the display 1110 where the light is emitted to provide a light flowing effect and may turn-on/turn-off the display element for emitting the light at a specified time interval to provide a light flickering effect depending on the type of the event. In one example, as in a third state 1105, the electronic device 1100 may set a light emitting region 1115 to a certain width and length and change the light emitting region 1115 up and down to apply the animation effect. In this case, the electronic device 1100 may turn-on/turn-off display elements corresponding to the light emitting region 1115 to provide an effect of the light emitting region 1115 moving up and down. In another example, the electronic device 1100 may set a plurality of regions where the light is emitted in a display region of the display 1110. For example, as in a fourth state 1107, the electronic device 1100 may set a first light emitting region 1115 in a top end region of the display 1110, set a second light emitting region 1117 in a central region, and set a third light emitting region 1119 in a bottom end region. In addition, the electronic device may change the set plurality of light emitting regions up and down.

As described above, according to various embodiments, a cover (e.g., the cover 100) may include a receiving portion (e.g., the receiving portion 150) having a space for receiving an electronic device (e.g., the electronic device 200), a covering portion (e.g., the covering portion 110), and a hinge portion (e.g., the hinge portion 130) connecting the receiving portion and the covering portion and allowing the covering portion to pivot. The covering portion may include, in a state in which the covering portion is pivoted in a specified direction about the hinge portion to at least partially cover the space, a light guiding member (e.g., the light guiding member 111) disposed on a first surface and for guiding light, and an outer cover layer (e.g., the outer cover layer 112) disposed on a second surface opposite to the first surface.

According to various embodiments, the receiving portion includes a plurality of side walls arranged along an edge region, and the electronic device may be received between the side walls.

According to various embodiments, the receiving portion, the hinge portion, and the outer cover layer may be integrally formed.

According to various embodiments, at least one of the receiving portion, the hinge portion, or the outer cover layer may be made of a polyurethane material.

According to various embodiments, a near-field communication (NFC) chip may be disposed in the receiving portion.

According to various embodiments, the light guiding member may be partially exposed to an outside, when viewed the covering portion from the front in a state where the covering portion at least partially covers the space.

According to various embodiments, the light guiding member may be exposed from at least one side surface of the covering portion to the outside.

According to various embodiments, the light guiding member may be exposed from at least one corner of the covering portion to the outside.

According to various embodiments, the outer cover layer may have an opening (e.g., the opening 911) defined inwardly of an edge region and the light guiding member may be exposed to the outside through the opening.

According to various embodiments, the light guiding member may be made of at least one of a fluorescent acrylic material, a light diffusing acrylic material, a transparent acrylic material, a polycarbonate material, or an optical fiber material.

According to various embodiments, the light guiding member may have, at an edge of the light guiding member, an inclined surface at a specified angle with the first surface, when viewed the covering portion from the front in a state where the covering portion at least partially covers the space.

According to various embodiments, when the electronic device is received in the space, a point at the end of the edge where the inclined surface starts overlaps a non-display region of a display included in the electronic device.

According to various embodiments, the light guiding member may be disposed on the first surface of the covering portion substantially in a single plate shape and have the edge region in a protruding shape.

According to various embodiments, the cover may further include a contact prevention member (e.g., the contact prevention member 116) disposed in the edge region of the light guiding member. In a state where the electronic device is received in the space and the covering portion at least partially covers the space, the contact prevention member may be in contact with one surface of the electronic device and the light guiding member may not be in contact with the one surface of the electronic device.

According to various embodiments, the contact prevention member may be made of a rubber material having a specified elastic force.

According to various embodiments, the cover may further include a magnetic substance (e.g., the magnetic substance 114) received in a portion of the light guiding member and a sheet (e.g., the sheet 115) disposed to cover the magnetic substance.

According to various embodiments, the cover may further include a film layer (e.g., the film layer 850) disposed between the outer cover layer and the light guiding member.

According to various embodiments, the cover may further include a bonding layer (e.g., the bonding layer 113) disposed between the outer cover layer and the light guiding member to bond the outer cover layer and the light guiding member with each other.

As described above, according to various embodiments, an electronic device (e.g., the electronic device 200) includes a display (e.g., the display 210) for emitting light to outside, a processor electrically connected to the display, and a memory electrically connected to the processor. The processor may determine whether a cover to be coupled covers at least one surface of the display via at least one sensor disposed in the electronic device and control the display to emit the light to the outside in response to a specified event occurred when the cover at least partially covers the display.

According to various embodiments, the sensor may include a hall sensor and the processor may be configured to determine that the cover at least partially covers the display when a magnetic field of a specified intensity or greater is detected via the sensor.

According to various embodiments, the processor may be configured to specify a color of the light emitted from the display or a light emitting region of the display at which the light is emitted based on a type of the event.

According to various embodiments, the processor may be configured to change the light emitting region for a specified time after the occurrence of the event.

According to various embodiments, the processor may control the display such that display elements corresponding to the light emitting region are turned-on and turned-off repeatedly at specified time intervals after the occurrence of the event.

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the processor to perform a function corresponding to the instruction.

The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instructions may contain a code made by a compiler or a code executable by an interpreter.

A module or a program module according to various embodiments may be composed of single entity or a plurality of entities, a part of the above-described sub-components may be omitted, or other sub-components may be further included. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. A cover comprising:
a receiving portion having a space for receiving an electronic device;
a covering portion; and
a hinge portion connecting the receiving portion and the covering portion and allowing the covering portion to pivot;
wherein the covering portion includes:
in a state in which the covering portion is pivoted in a specified direction about the hinge portion to at least partially cover the space,
a light guiding member disposed on a first surface for guiding light; and
an outer cover layer disposed on a second surface opposite to the first surface,
wherein the light guiding member includes a top surface facing the outer cover layer, a bottom surface opposite to the top surface, and an inclined surface connecting edges of the top surface and edges of the bottom surface,
wherein the top surface of the light guiding member protrudes in a side surface direction further than the bottom surface of the light guide member, and the light is refracted in a top surface direction by the inclined surface and released to an outside of the light guiding member,
wherein the electronic device includes a display facing the light guiding member in a state where the electronic device is received in the space and the covering portion at least partially covers the space,
wherein the display includes a display area and a non-display area surrounding at least a portion of the display area, and
wherein a distance between an edge where the bottom surface and the inclined surface are connected and the display area is substantially equal to a thickness of the non-display area.

2. The cover of claim 1, wherein the receiving portion includes a plurality of side walls arranged along an edge region,
wherein the electronic device is received between the side walls.

3. The cover of claim 1, wherein the receiving portion, the hinge portion, and the outer cover layer are integrally formed.

4. The cover of claim 1, wherein at least one of the receiving portion, the hinge portion, or the outer cover layer is made of a polyurethane material.

5. The cover of claim 1, wherein a near-field communication (NFC) chip is disposed in the receiving portion.

6. The cover of claim 1, wherein the light guiding member is made of at least one of a fluorescent acrylic material, a light diffusing acrylic material, a transparent acrylic material, a polycarbonate material, or an optical fiber material.

7. The cover of claim 1, wherein the inclined surface forms a specified angle with the first surface in a font view of the covering portion in a state where the covering portion at least partially covers the space.

8. The cover of claim 1, further comprising:
a magnetic substance received in a portion of the light guiding member; and
a sheet disposed to cover the magnetic substance.

9. The cover of claim 1, wherein the cover further includes a contact prevention member disposed in an edge region of the light guiding member,
wherein in a state where the electronic device is received in the space and the covering portion at least partially covers the space, the contact prevention member is in contact with one surface of the electronic device and the light guiding member is not in contact with the one surface of the electronic device.

10. The cover of claim 9, wherein the contact prevention member is made of a rubber material having a specified elastic force.

11. The cover of claim 1, wherein the light guiding member is partially exposed to an outside in a front view of the covering portion in a state where the covering portion at least partially covers the space.

12. The cover of claim 11, wherein the light guiding member is exposed from at least one side surface of the covering portion to the outside.

13. The cover of claim 11, wherein the light guiding member is exposed from at least one corner of the covering portion to the outside.

14. The cover of claim 11, wherein the outer cover layer has an opening defined inwardly of an edge region and
wherein the light guiding member is exposed to the outside through the opening.

* * * * *